(12) United States Patent
Manea et al.

(10) Patent No.: US 9,882,738 B2
(45) Date of Patent: *Jan. 30, 2018

(54) SINGLE-WIRE COMMUNICATIONS USING ITERATIVE BAUD LEARNING

(71) Applicant: Atmel Corporation, San Jose, CA (US)

(72) Inventors: Danut Manea, Saratoga, CA (US); Jeffrey P. Kotowski, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,083

(22) Filed: Nov. 7, 2016

(65) Prior Publication Data

US 2017/0054572 A1    Feb. 23, 2017

Related U.S. Application Data

(63) Continuation of application No. 14/607,456, filed on Jan. 28, 2015, now Pat. No. 9,490,999.

(51) Int. Cl.
*H04L 7/00* (2006.01)
*H04L 12/40* (2006.01)

(52) U.S. Cl.
CPC .. *H04L 12/40032* (2013.01); *H04L 12/40136* (2013.01); *Y02B 60/31* (2013.01)

(58) Field of Classification Search
CPC ..... H04L 7/0337; H04L 7/0334; H04L 7/033; H04L 7/0029; H04L 7/0008; H04L 7/02; H04L 7/0331; H03L 7/091
USPC .......................... 375/354, 355, 219, 295, 316
See application file for complete search history.

(56) References Cited

U.S. PATENT DOCUMENTS

| | | | |
|---|---|---|---|
| 5,210,846 A | 5/1993 | Lee | |
| 5,483,176 A | 1/1996 | Rodriguez et al. | |
| 5,978,927 A | 11/1999 | Curry et al. | |
| 5,994,770 A | 11/1999 | Harrington et al. | |
| 6,239,732 B1 | 5/2001 | Cusey | |
| 6,532,506 B1 | 3/2003 | Dunstan | |
| 7,006,949 B2 | 2/2006 | Moore | |
| 7,111,097 B2 | 9/2006 | Lin | |
| 7,127,538 B1 | 10/2006 | Nekl | |
| 7,406,100 B2 | 7/2008 | Rocas et al. | |
| 7,519,005 B2 | 4/2009 | Hejdeman et al. | |
| 7,577,756 B2 | 8/2009 | Teowee et al. | |
| 7,667,534 B2 | 2/2010 | Klein | |
| 7,782,240 B2 | 8/2010 | Ng et al. | |
| 7,881,415 B2 | 2/2011 | Ng | |
| 8,509,318 B2 | 8/2013 | Tailliet | |
| 8,683,101 B2 | 3/2014 | Ingels | |

(Continued)

*Primary Examiner* — Zewdu Kassa
(74) *Attorney, Agent, or Firm* — Fish & Richardson P.C.

(57) ABSTRACT

Systems and techniques for single-wire communications are described. A described technique includes detecting transitions on a single-wire bus that are produced by a host device, determining an estimated baud rate of the host device based on the transition, and communicating with the host device based on the estimated baud rate. Determining the estimated baud rate can include charging a capacitor based on a charging rate in response to a detection of a first transition of the transitions, sampling a capacitor voltage associated with the capacitor in response to a detection of a second transition of the transitions, and adjusting the charging rate based on a comparison between the capacitor voltage and a reference voltage.

20 Claims, 7 Drawing Sheets

(56) References Cited

U.S. PATENT DOCUMENTS

| | | | |
|---|---|---|---|
| 8,698,358 B1 | 4/2014 | Peak et al. | |
| 8,719,613 B2 | 5/2014 | Neben | |
| 8,750,324 B2 | 6/2014 | Hansquine et al. | |
| 8,775,707 B2 | 7/2014 | Poulsen | |
| 9,397,492 B2 | 7/2016 | Voelger | |
| 9,490,999 B2 | 11/2016 | Manea et al. | |
| 9,652,431 B2 | 5/2017 | Asanghanwa | |
| 2012/0027104 A1* | 2/2012 | Bas | G06F 13/4295 375/253 |
| 2012/0144078 A1* | 6/2012 | Poulsen | G06F 13/4291 710/105 |
| 2016/0217100 A1 | 7/2016 | Asamghanwa | |

\* cited by examiner

SINGLE-WIRE COMMUNICATIONS USING ITERATIVE BAUD LEARNING

CLAIM OF PRIORITY

This patent document claims priority under 35 USC §119(e) to U.S. patent application Ser. No. 14/607,456, filed on Jan. 28, 2015, the entire contents of which are hereby incorporated by reference.

TECHNICAL FIELD

This patent document relates generally to single-wire communications.

BACKGROUND

Devices can use a single-wire bus for bidirectional communications. A host device can be connected with a slave device via a single-wire bus. Both the host device and the slave device can be connected to ground to complete the circuit. In some instances, a slave device is implemented as an integrated circuit that is packaged in a housing that contains three or more pins: one for the single-wire bus, one for an input voltage, and one for ground. In some instances, a slave device is implemented as an integrated circuit that is packaged in a housing that contains two pins: one for the single-wire bus and one for ground. The slave device can be powered parasitically from the single-wire bus. A single-wire bus can interconnect two or more devices.

SUMMARY

This document describes, among other things, technologies relating to single-wire communications. In one aspect, a described technique can include detecting transitions on a single-wire bus that are produced by a host device; determining an estimated baud rate of the host device based on the transitions by approximating a bit transition rate associated with the transitions by iteratively adjusting a charging rate of a capacitor to match the bit transition rate; and communicating with the host device based on the estimated baud rate.

This and other implementations can include one or more of the following features. Determining the estimated baud rate can include resetting the capacitor in response to a detection of a first transition of the transitions; charging the capacitor based on the charging rate; determining, in response to a detection of a second transition of the transitions, a comparison result based on whether a capacitor voltage associated with the capacitor is less than a reference voltage; and adjusting the charging rate based on the comparison result. Adjusting the charging rate based on the comparison result can include increasing the charging rate if the capacitor voltage is less than the reference voltage; and decreasing the charging rate if the capacitor voltage is not less than the reference voltage. Resetting the capacitor can include switching on a transistor to discharge the capacitor. Determining the estimated baud rate can include controlling the charging rate of the capacitor based on a control register comprising a plurality of bits arranged from a most significant bit to a least significant bit. Iteratively adjusting the charging rate can include determining bit-by-bit each of the bits of the control register through successive ones of the transitions by starting with the most significant bit and ending with the least significant bit. Implementations can include using digital logic circuitry to sample a comparator output that is responsive to a reference voltage and a capacitor voltage associated with the capacitor. The digital logic circuitry can be configured to sample the comparator output based on detection of one of the transitions. In some implementations, the transitions include falling edge transitions.

In other aspect, a system can include a host device, and a slave device coupled with the host device via a single-wire bus. The slave device can be configured to perform operations including detecting transitions on a single-wire bus that are produced by the host device; determining an estimated baud rate of the host device based on the transitions by approximating a bit transition rate associated with the transitions by iteratively adjusting a charging rate of a capacitor to match the bit transition rate; and communicating with the host device based on the estimated baud rate.

In another aspect, a device can include a detector operable to detect transitions on a single-wire bus that are produced by a host; a timing estimator configured to determine an estimated baud rate of the host based on the transitions by approximating a bit transition rate associated with the transitions by iteratively adjusting a charging rate of a capacitor to match the bit transition rate; and circuitry operable to communicate with the host based on the estimated baud rate.

These and other implementations can include one or more of the following features. The timing estimator can be configured to reset the capacitor in response to a detection of a first transition of the transitions, charge the capacitor based on the charging rate, determine, in response to a detection of a second transition of the transitions, a comparison result based on whether a capacitor voltage associated with the capacitor is less than a reference voltage, and adjust the charging rate based on the comparison result. The timing estimator can be configured to adjust the charging rate by increasing the charging rate if the capacitor voltage is less than the reference voltage. The timing estimator can be configured to adjust the charging rate by decreasing the charging rate if the capacitor voltage is not less than the reference voltage. Implementations can include a transistor coupled with the capacitor. The timing estimator can be configured to reset the capacitor by switching on the transistor to discharge the capacitor. The timing estimator can be configured to determine the estimated baud rate by controlling the charging rate of the capacitor based on a control register comprising a plurality of bits arranged from a most significant bit to a least significant bit. Iteratively adjusting the charging rate can include determining bit-by-bit each of the bits of the control register through successive ones of the transitions by starting with the most significant bit and ending with the least significant bit. Implementations can include digital logic circuitry configured to sample a comparator output that is responsive to a reference voltage and a capacitor voltage associated with the capacitor. The digital logic circuitry can be configured to sample the comparator output based on detection of one of the transitions. The transitions can include falling edge transitions. Implementations can include a non-volatile memory structure; and a processor configured to perform an operation responsive to a command received over the single-wire bus. The operation can include retrieving data from the non-volatile memory structure in response to the command. The processor can be configured to cause the data to be transmitted to the host based on the estimated baud rate.

The details of one or more embodiments of the subject matter described in this document are set forth in the accompanying drawings and the description below. Other features, aspects, and advantages of the subject matter will become apparent from the description, the drawings, and the claims.

DETAILED DESCRIPTION

A system can include a host device communicatively coupled with a slave device over a single-wire bus. The devices can exchange data over the single-wire bus, for example, by causing voltage transitions. The timing of communications using the single-wire bus can be set by the host device and can change over the course of operation. For example, the host device can switch between high and low performance modes that are associated with high and low clock frequencies. The host may transmit faster on the bus during the high clock frequency and transmit more slowly on the bus during the low clock frequency. The slave device can determine the host device's timing information, such as a clock frequency or bit timing, and use the information for one or more communications with the host device. The slave device, for example, periodically can perform a synchronization operation during which the slave device learns the baud rate of the host device.

In some implementations, the host device can write data byte-by-byte to the slave device, and can read data byte-by-byte from the slave device over the single-wire bus. In some implementations, the host device can write data bit-by-bit to the slave device, and can read data bit-by-bit from the slave device over the single-wire bus. For example, the host device can request an N-bit value from the slave device by transmitting a data request command to the slave device. For each bit of the N-bit value, the host can transmit synchronization signaling and, in response, can receive a respective bit of the N-bit value. In some implementations, the slave device includes a co-processor such as a cryptographic processor. In some implementations, the slave device includes a sensor controller. In some implementations, the slave device includes a non-volatile memory and provides a random access interface to the host device for accessing data stored in the non-volatile memory. Other types of slave devices are possible. In some implementations, the slave device can be powered parasitically by the single-wire bus.

Figure 1:
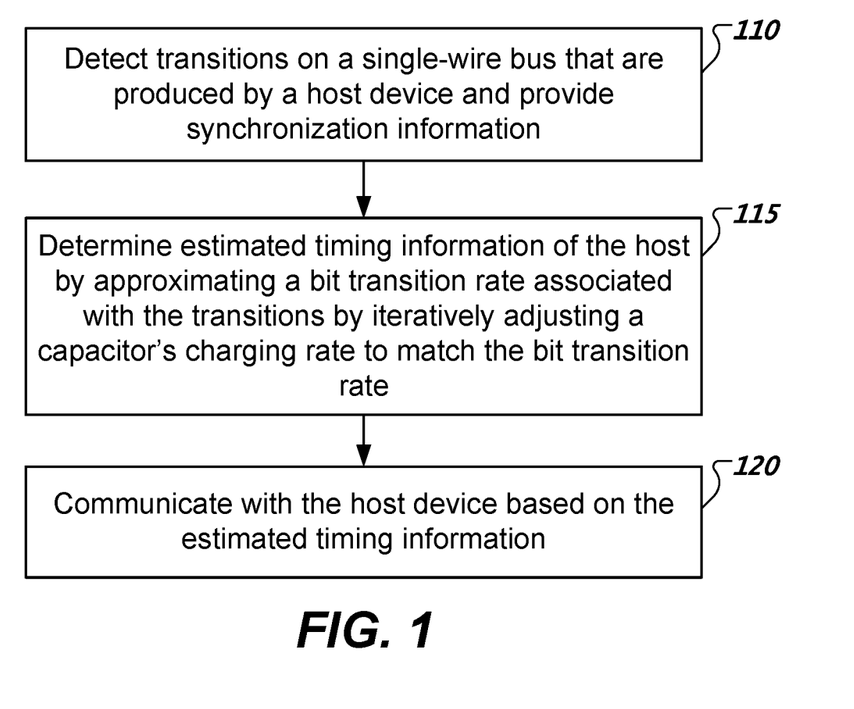
FIG. 1 is a flowchart illustrating an example of a communication process that includes a synchronization operation performed by a slave device coupled with a host device via a single-wire bus.

As shown in the example of FIG. 1, a communication process includes a synchronization operation performed by a slave device that is coupled with a host device via a single-wire bus. At 110, the process detects transitions (e.g., voltage transitions) on a single-wire bus that are produced by a host device and provide synchronization information. Detecting transitions can include, for example, detecting a falling edge transition. In some implementations, the transitions are associated with a synchronization operation. In some cases, the transitions are associated with a command sequence. In some instances, based on detecting a command sequence, the slave device can start a synchronization operation. In some implementations, detecting transitions can include detecting signal logical level transitions.

At 115, the process determines an estimated timing information of the host by approximating a bit transition rate associated with the transitions by iteratively adjusting a capacitor's charging rate to match the bit transition rate. In some implementations, determining timing information can include determining an estimated baud rate of the host device. In some implementations, the bit transition rate is matched to within a predetermined tolerance threshold. The threshold can be based, for example, on one or more component delays associated with the slave device.

At 120, the process communicates with the host device based on the estimated timing information. Communicating with the host device can include transmitting data or receiving data in accordance with the timing information. In some implementations, the process communicates with the host device based on timing information such as an estimated baud rate. In some implementations, a baud rate can be expressed in bits per second.

In some implementations, the process, at 115, includes performing an adjustment operation triggered on detection of a falling edge transition. The adjustment operation can include resetting the capacitor, charging the capacitor based on the charging rate, determining a comparison result based on whether a capacitor voltage associated with the capacitor is less than a reference voltage, and adjusting the charging rate based on the comparison result. Adjusting the charging rate can include increasing the charging rate if the capacitor voltage is less than the reference voltage. Adjusting the charging rate can include decreasing the charging rate if the capacitor is not less than the reference voltage. In some implementations, adjusting the charging rate can include decreasing the charging rate if the capacitor is greater than the reference voltage. In some implementations, the charging rate is adjusted two or more times based, respectively, on two or more falling edge transitions.

Figure 2:
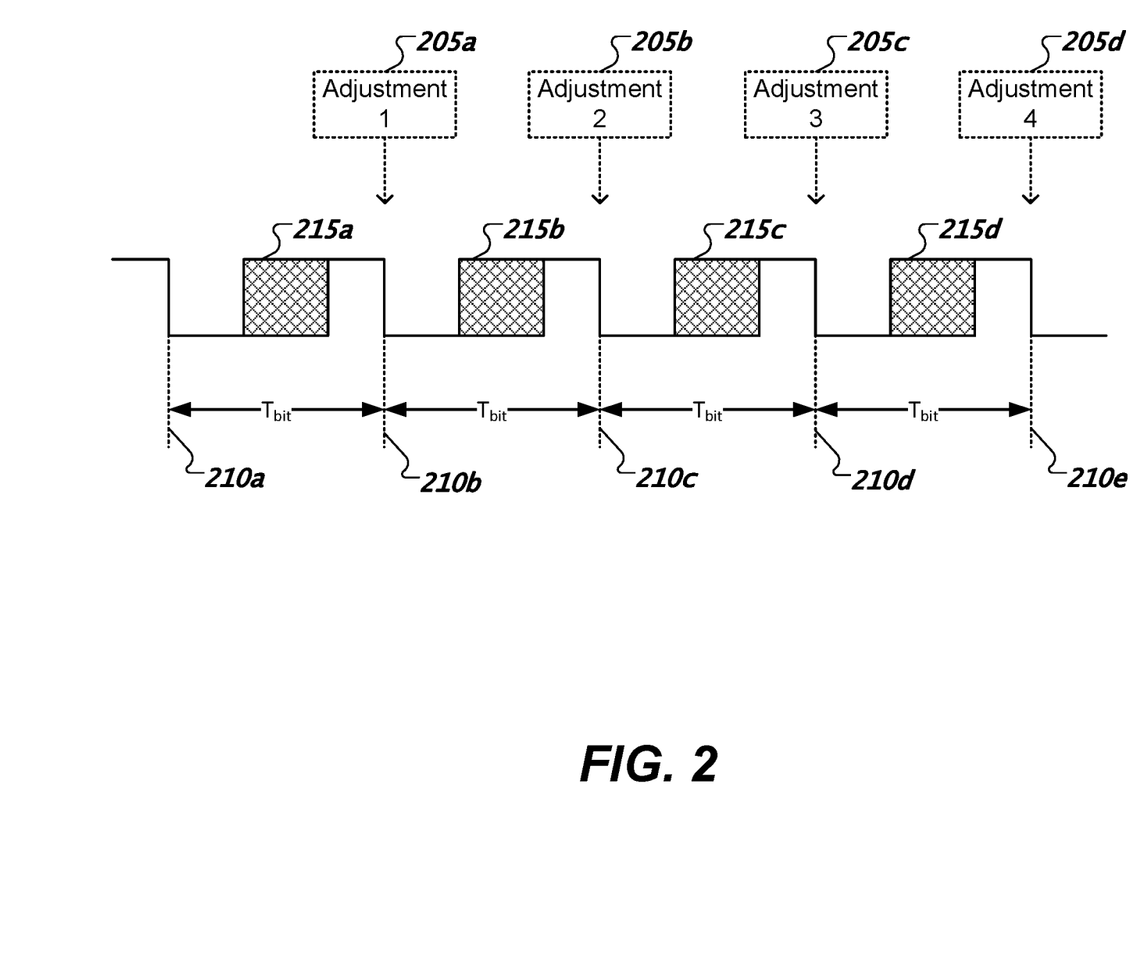
FIG. 2 is a timing diagram illustrating an example of a timing relationship among bit transitions and successive adjustments at a slave device.

FIG. 2 is a timing diagram illustrating an example of a timing relationship among bit transitions and successive adjustments at a slave device. In this example, a host device transmits bits 215a-d of information to the slave device. The bits 215a-d can be included, for example, in a command sequence. Each of the bits 215a-d is transmitted after a respective falling edge transition 210a-e. In this example, a bit timing (Tbit) is defined as the period of time between a first falling edge transition 210a-e and a subsequent, second failing-edge transition 210a-e. During a synchronization operation, the slave device refines its estimate of the host's bit timing by making successive adjustments 205a-d to the estimate. In some instances, the bit timing is controlled by a bit transition rate.

In some implementations, the adjustments 205a-d include changes to a charging rate of a capacitor by increasing or decreasing a value within a control register. In some implementations, each of the adjustments 205a-d corresponds to a bit of the control register, with the initial adjustment 205a altering the most significant bit of the control register and remaining adjustments 205b-d altering the less significant bits of the control register. More or fewer adjustments than those shown can be used. In some implementations, the number of adjustments 205a-d corresponds to the number of bits within a synchronization preamble. In some implementations, the number of adjustments 205a-d corresponds to the number of bits within a command sequence.

Figure 3:
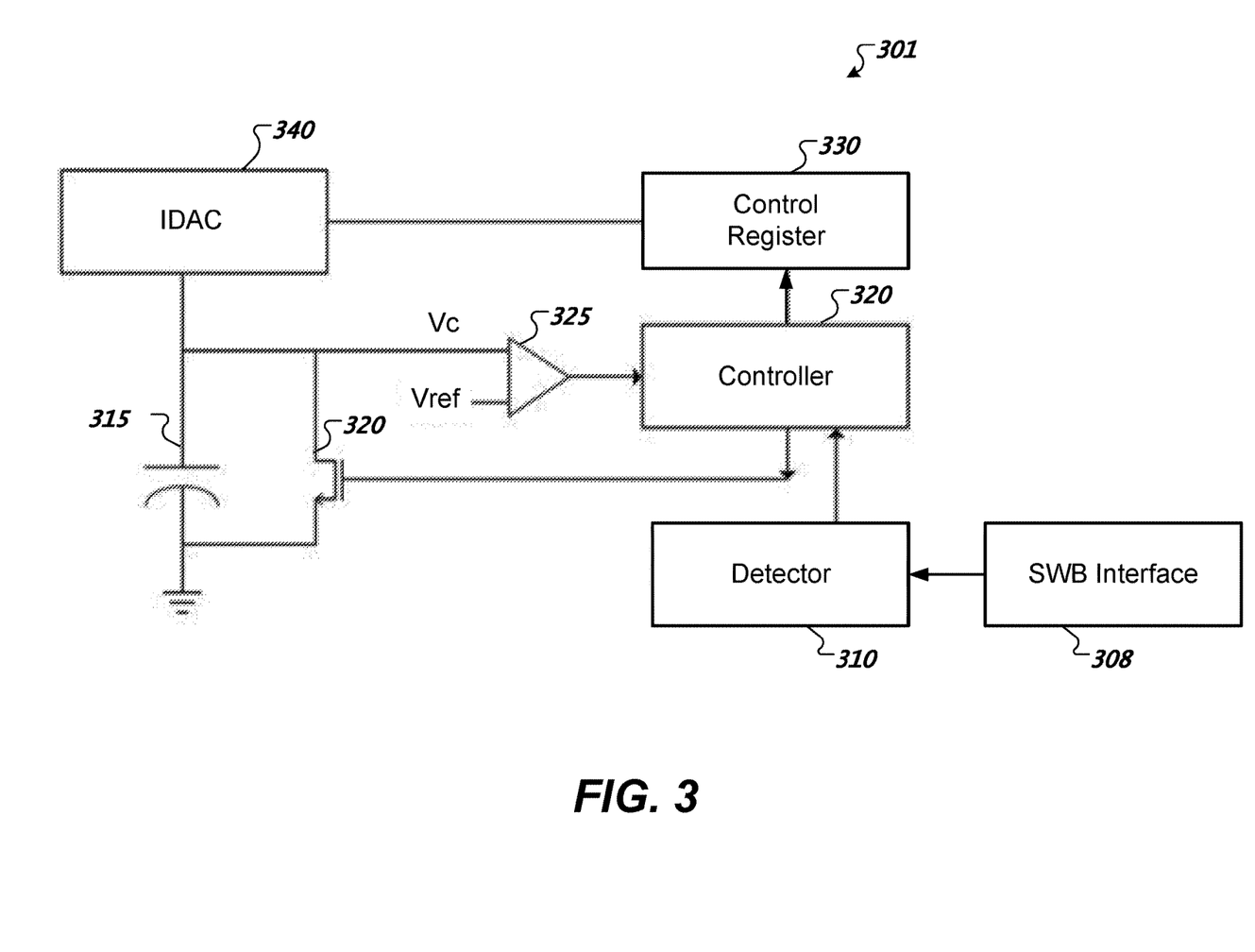
FIG. 3 is a diagram illustrating an example of a bit timing estimator.

As shown in FIG. 3, a timing estimator 301 can include a controller 320, single-wire bus interface 308, detector 310, capacitor 315, comparator 325, control register 330, and current digital-to-analog converter (IDAC) 340. During a synchronization operation, the timing estimator 301 is configured to approximate successively a bit timing associated with a signal received over the single-wire bus interface 308. The timing estimator 301 approximates the bit timing by adjusting a charging rate of the capacitor 315, such that over a period of N transitions, the charging rate converges to a final charging rate that is used to compute the bit timing. The charging rate is controlled by a value stored in the control register 330. In some implementations, the control register 330 is initialized to a mid-point value from which the value is successively increased or decreased over the N transitions based on whether the capacitor 315 was charged too quickly or too slowly. For example, after a discharge in response to a falling edge transition, the final version of the charging rate is able to charge the capacitor 315 such that the capacitor 315 reaches a predetermined level of charge at the time of the next falling edge transition.

The detector 310 detects falling edge transitions of a signal received from a single-wire bus interface 308. The detector 310 provides a detection output to the controller 320. Responsive to detecting a falling edge transition, the controller 320 resets the capacitor 315 to a zero charge by switching on the transistor 320 for a predetermined amount of time which shorts, i.e., discharges, the capacitor 315. After the capacitor 315 is discharged, it is allowed to charge based on a current output from the IDAC 340 in accordance with a charging rate indicated by the control register 330. In this example, the control register 330 controls a current output of the IDAC 340, which in turns controls the charging rate.

The timing estimator 301 uses a comparator 325 to determine whether the capacitor 315 has obtained at least a predetermined level of charge. In some implementations, the predetermined level of charge is based on a reference voltage and a capacitance (C) of the capacitor 315. The comparator 325 compares a reference voltage (Vref) and a capacitor voltage (Vc) associated with the capacitor 315 to produce a comparison output. The capacitor voltage is proportional to a charge level of capacitor 315, e.g., higher charge corresponds to a higher voltage. In some implementations, the values of C, Vref, and the full scale current associated with IDAC 340 can be based on one or more design criteria including the supply range of the system, the nominal absolute time of Tbit, the combined variation of Tbit and the implementation variation, the allowable system current, or a combination thereof. Vref can be set to within the supply range such that the comparator 325 can operate adequately. In some implementations, Vref can be set to approximately 1.25 volts. In some implementations, values of the capacitance (C) can be in the range of a few pF. In some implementations, the IDAC full scale current can be in the range of a few micro Amps. In some implementations, the timing estimator 301 can be used to perform adjustments to a frequency due component variations within +100% to −50% of a target frequency. For example, a system designed around a frequency of 800 Khz, for example, can use a 1 pF capacitor that can charge to 1.25 volts in one period when charged with a 1 uA current source. Thus, the IDAC full scale current can be set to 2 uA to allow for +100% variation. Other frequencies and component values are possible.

Responsive to a subsequent falling edge transition, a digital-to-analog converter (DAC) within the controller 320 samples the comparison output produced by the comparator 325. The controller 320 adjusts the charging rate by increasing or decreasing the value stored in the control register 330. For example, if Vc<Vref, the charging rate is increased. If Vc≥Vref, the charging rate is decreased. The timing estimator 301 proceeds to charge the capacitor 315 at the adjusted rate and performs subsequent samplings and adjustments until the end of the synchronization operation.

Figure 4:
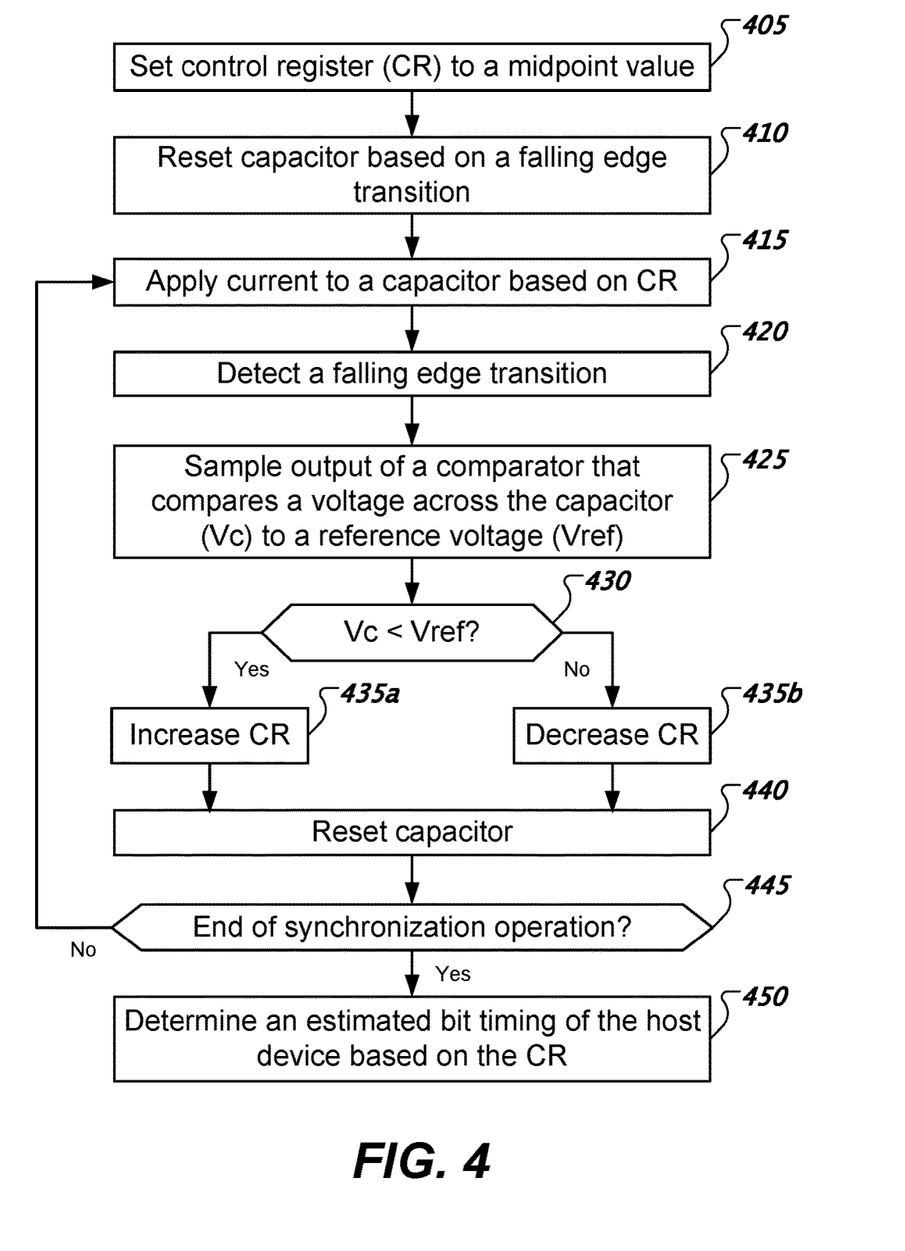
FIG. 4 is a flowchart illustrating an example of a bit timing estimation process performed by a slave device in communication with a host device via a single-wire bus.

FIG. 4 illustrates an example of a bit timing estimation process performed by a slave device that is in communication with a host device via a single-wire bus. At 405, the process sets a control register to a midpoint value. In some implementations, the midpoint value of an N-bit control register is $2^{(N-1)}$. In some implementations, N is 8. Other values for N are possible. For example, a higher value for N can yield a higher accuracy. Likewise, a lower value for N can yield a lower accuracy. The requirement for N can be set by the accuracy required in data timing. Note that the accuracy can be limited by the number of bits (M) used for synchronization. Further, note that N and M can be the same value. If the system required 1% accuracy in data timing, for example, the system can use a 7-bit register, as $2^7$ is 128 and would be accurate to roughly 1 part in 128 and meet the 1% requirement.

At 410, the process resets a capacitor based on a falling edge transition. In some implementations, resetting the capacitor can include shorting the capacitor. At 415, the process applies a current to a capacitor based on the control register. Applying a current can include operating a variable current source such as an IDAC based on a value stored in the control register. In some implementations, the IDAC has $2^N$ discrete current levels. At 420, the process detects a falling edge transition. Detecting a transition can include using edge-detection logic circuitry that triggers on a failing edge of an input waveform. At 425, the process samples an output of a comparator that compares a voltage across the capacitor (Vc) to a reference voltage (Vref). In some implementations, the reference voltage corresponds to a predetermined charge level for the capacitor. At 430, the process determines whether Vc<Vref. At 435a, the process increases the control register based on Vc being less than Vref. Alternatively, at 435b, the process decreases the control register based on Vc being greater than or equal to Vref. At 440, the process resets the capacitor.

At 445, the process determines whether the synchronization operation has completed. In some implementations, determining whether the synchronization operation has completed can include detecting an end of a command sequence. In some implementations, determining whether the synchronization operation has completed can include tracking the number of adjustments and comparing the result to a predetermined number that corresponds to a maximum number of adjustments. If not complete, the process continues at 420. If complete, the process, at 450, determines an estimated bit timing of the host device based on the control register. In some implementations, an estimated baud rate can be computed from the estimated bit timing.

Figure 5:
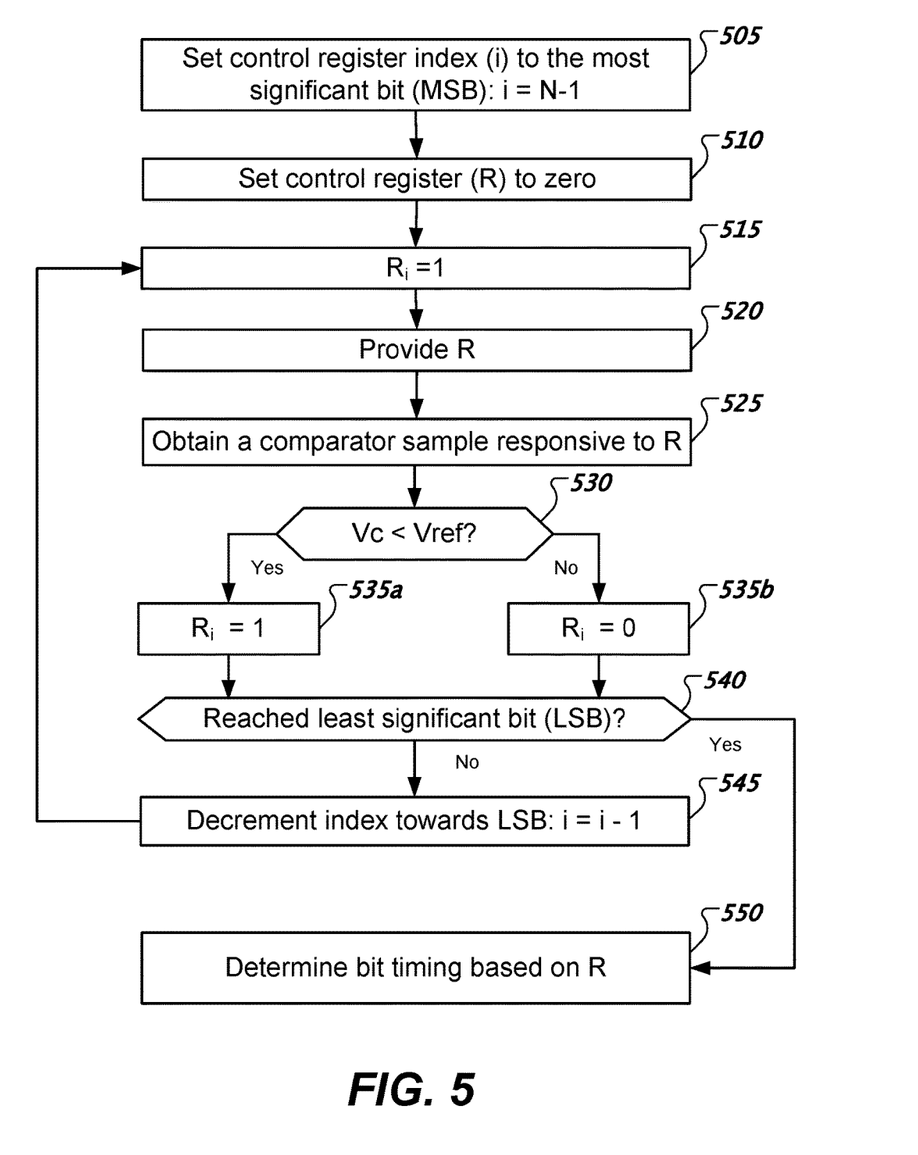
FIG. 5 is a flowchart illustrating an example of a bit timing estimation process that includes successively adjusting a control register.

FIG. 5 illustrates an example of a bit timing estimation process that includes successively adjusting a control register. At 505, the process sets a control register index (i) to a value corresponding to the most significant bit (MSB). For example, the control register index can be set to N−1, where N is the number of bits. At 510, the process sets all bits in a control register (R) to zero. At 510, the process sets the bit of the register corresponding to the index to binary one. These actions (505, 510), during the initial iteration, set the control register to a midpoint value. At 520, the process provides the control register. In doing so, a capacitor is charged based on a charging rate corresponding to the value specified by the control register. At 525, the process obtains a comparator sample that is responsive to the control register. Obtaining a comparator sample can include using digital logic circuitry to sample a comparator output that is responsive to a reference voltage (Vref) and a capacitor voltage (Vc) associated with the capacitor. At 530, the process determines whether Vc<Vref based on the comparator sample. At 535a, the process sets the bit of the register corresponding to the index to binary one based on Vc being less than Vref. Alternatively, at 535b, the process sets the bit of the register corresponding to the index to binary zero based on Vc being greater than or equal to Vref. At 540, the process determines whether the least significant bit (LSB) has been reached. If the LSB has not been reached, the process at 545 decrements the index towards the LSB and continues at 510. If the LSB has been reached, the process at 545 determines a bit timing based on the control register.

Figure 6:
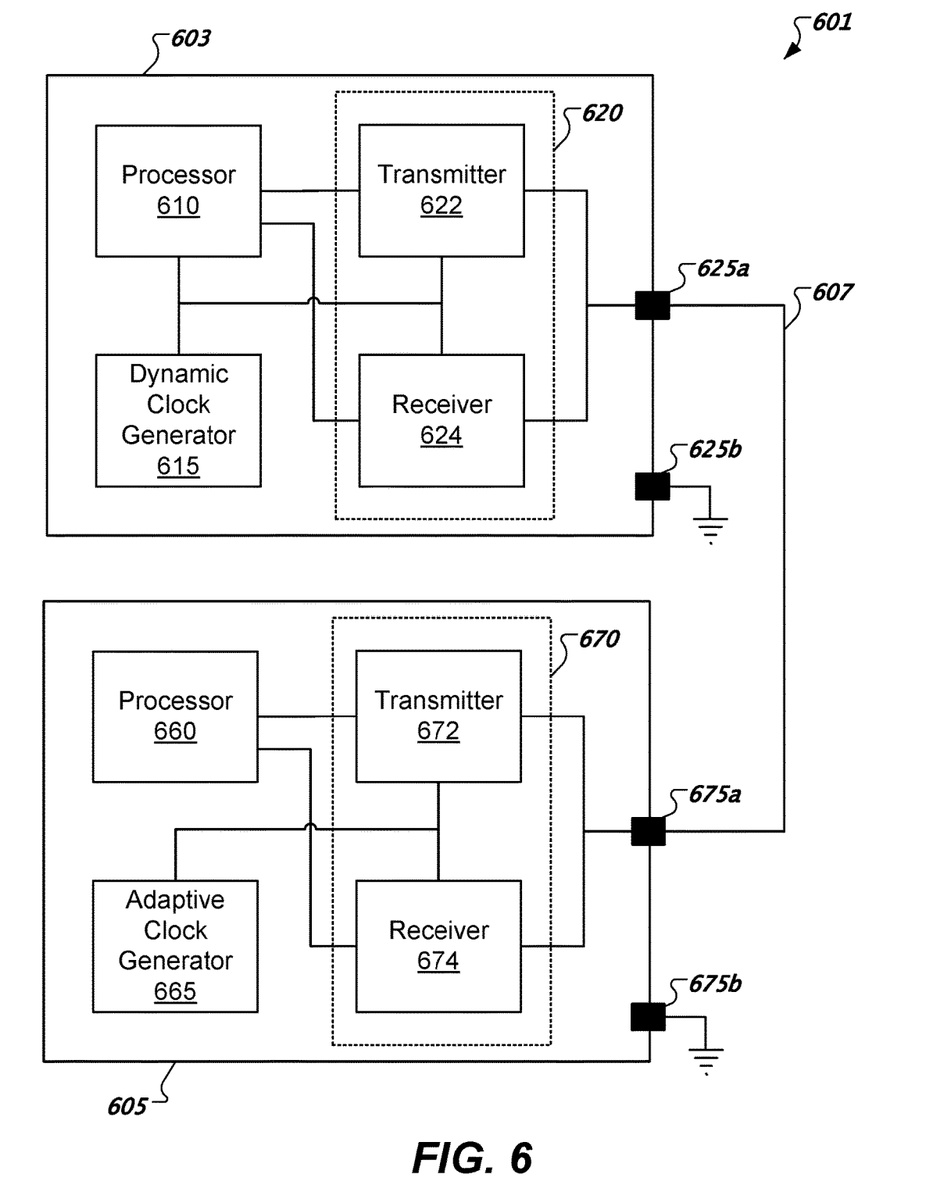
FIG. 6 is a diagram illustrating an example of a single-wire bus based system.

FIG. 6 illustrates an example of a single-wire bus based system 601. The system 601 can include a host device 603 and a slave device 605. The host device 603 and the slave device 605 can be connected to each other electrically via a single-wire bus 607. In some implementations, the single-wire bus 607 includes an electrical conduit formed on a printed circuit board or through a wire. In some cases, the single-wire bus 607 interconnects two devices. In some instances, the single-wire bus 607 interconnects three or more devices.

The host device 603 can include, for example, a processor 610, dynamic clock generator 615, and a host single-wire bus interface 620. The host single-wire bus interface 620 can include a transmitter 622 and a receiver 624. The transmitter 622 and the receiver 624 can be coupled electrically with a pin 625a of the host device 603 that is intended for coupling with the single-wire bus 607. Another pin 625b of the host device 603 can provide a connection to ground. In some implementations, the pins 625a-b are pins of an integrated circuit package that forms the host device 603. The dynamic clock generator 615 can include a variable clock frequency generator that is configured to produce one or more different clock frequencies for the processor 610 and the host single-wire bus interface 620. In some implementations, the processor 610 can adjust the dynamic clock generator 615 to increase a host clock frequency or decrease the host clock frequency based on a current or predicted processing load of the processor 610. Based on a command from the processor 610 and a clock frequency of the dynamic clock generator 615, the transmitter 622 can generate and transmit information such as synchronization signaling, command sequence, or both. The timing of transitions within the synchronization signaling can be based on host timing information such as a host baud rate, host clock frequency, or a host bit timing.

The slave device 605 includes, for example, a processor 660, adaptive clock generator 665, and a slave single-wire bus interface 670. The slave single-wire bus interface 670 can include a transmitter 672 and a receiver 674. In some implementations, the adaptive clock generator 665 can use synchronization signaling received over the slave single-wire bus interface 670 via the receiver 674 to determine host timing information such as the bit timing, clock frequency, or baud rate of the host device 603. The adaptive clock generator 665 can provide the determined host clock frequency to the transmitter 672 and the receiver 674. The transmitter 672 and the receiver 674 can be coupled electrically with a pin 675a of the slave device 605 that is intended to couple with the single-wire bus 607. Another pin 675b of the slave device 605 can provide a connection to ground. In some implementations, the pins 675a-b are pins of an integrated circuit package that forms the slave device 605.

In some implementations, one or both of the processors 610, 660 include one or more general purpose processors, field programmable gate array (FPGA), application specific integrated circuit (ASIC), digital signal processor (DSP), or a combination thereof. The devices 603, 605 can include one or more memory structures such as a non-volatile memory structure. The processor 660 of the slave device 605 can be configured to perform an operation responsive to a command received over the single-wire bus from the host device 603. A command such as a read command can cause the slave device 605 to retrieve an N-bit value from the non-volatile memory structure and transmit the retrieved value to the host device 603. In some implementations, the devices 603, 605 can include one or more additional pins (not shown) such as a voltage input pin.

Figure 7:
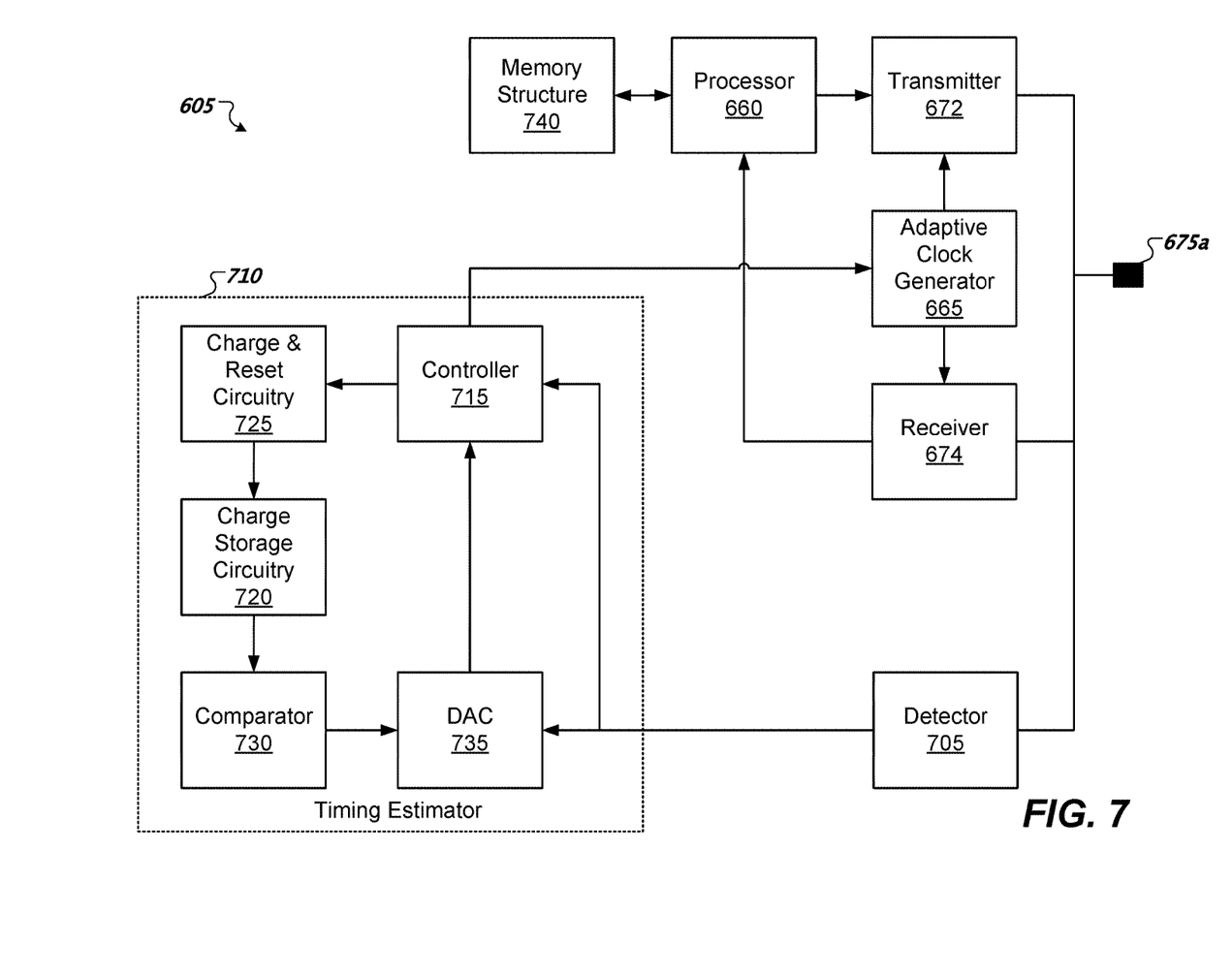
FIG. 7 is a diagram illustrating an example of a slave device of the system of FIG. 6.

FIG. 7 illustrates an example of a slave device 605 of the system 601 of FIG. 6. The slave device 605 includes a processor 660, adaptive clock generator 665, transmitter 672, receiver 674, detector 705 and timing estimator 710. The detector 705 can be configured to detect transitions received over pin 675a from the single-wire bus 607 that are produced by the host device 603. The detector 705 can include falling edge detection logic circuitry. The timing estimator 710 can use the detected transitions to determine timing information such as the host clock frequency of the host device 603 or a host bit timing. In some implementations, the host bit timing can be represented as a bit transition rate. In some implementations, the timing estimator 710 provides timing information such as a bit transition rate to the adaptive clock generator 665, which in turns controls bit transitions within the transmitter 672 and the receiver 674.

The timing estimator 710 includes a controller 715, charge and reset circuitry 725, charge storage circuitry 720, comparator 730, and DAC 735. The charge and reset circuitry 725 can reset the charge storage circuitry 720 responsive to a reset control signal from the controller 715. The charge storage circuitry 720 can include one or more capacitors. In some implementations, the charge and reset circuitry 725 includes a transistor that, when activated by the controller 715, discharges the charge storage circuitry 720. The reset time can be relatively brief compared to the overall duration between successive fall edge transitions. The charge and reset circuitry 725 can charge the charge storage circuitry 720 based on a charging rate set by the controller 715. In some implementations, the charge and reset circuitry 725 includes a variable current source that is responsive to the charging rate. In some implementations, the charge and reset circuitry 725 includes a variable voltage source that is responsive to the charging rate.

The comparator 730 can compare a reference voltage and a voltage associated with the charge storage circuitry 720. If the voltage associated with the charge storage circuitry 720 is less than the reference voltage, then the comparator 730 outputs a low voltage; otherwise, the comparator 730 outputs a high voltage. Responsive to a transition detected by the detector 705 but before a reset, the DAC 735 can sample an output of the comparator 730 to produce a one bit binary output that represents whether the voltage associated with the charge storage circuitry 720 is or is not less than the reference voltage. In some implementations, the DAC 735 can produce two or more bits of output. Based on the output of the DAC 735, the controller 715 adjusts the charging rate. After the DAC 735 samples the output of the comparator 730, the controller 715 can cause the charge and reset circuitry 725 to reset the charge storage circuitry 720.

In some implementations, the controller 715 iteratively can adjust a control register corresponding to the charging rate over N transitions. The controller 715 can be configured to determine, bit-by-bit, each of the bits of the control register through successive transitions by starting with the most significant bit of the register and ending with the least significant bit. After the least significant bit is determined, the controller 715 can compute timing information based on the control register, and provide the timing information to the adaptive clock generator 665. The adaptive clock generator 665 can store the timing information and provide it to the transmitter 672 and receiver 674.

The slave device 605 can include a memory structure 740. In some implementations, the processor 660 is configured to perform an operation responsive to a command received over the single-wire bus 607. For example, data can be retrieved from the memory structure 740 in response to a read command. In some cases, the transmitter 672 includes a transmission buffer. In some implementations, the transmitter 672 transmits one or more bits from the transmission buffer at a rate determined by the timing estimator 710. In some instances, the receiver 674 includes a reception buffer. In some implementations, the receiver 674 samples the single-wire bus 607 and inserts a bit into the reception buffer at a rate determined by the timing estimator 710. In some cases, the timing estimator 710 includes the detector 705. In some instances, the adaptive clock generator 665 includes the timing estimator 710.

In some implementations, a device can include a detector operable to detect transitions on a single-wire bus that are produced by a host; a timing estimator configured to determine an estimated baud rate of the host based on the transitions by approximating a bit transition timing associated with the transitions by iteratively adjusting a charging time of a capacitor to match the bit transition timing; and circuitry operable to communicate with the host based on the estimated baud rate. In some implementations, the timing estimator is configured to reset the capacitor in response to a detection of a first transition of the transitions, charge the capacitor based on the charging time, determine, in response to a detection of a second transition of the transitions, a comparison result based on whether a capacitor voltage associated with the capacitor is less than a reference voltage, and adjust the charging time based on the comparison result. In some implementations, the capacitor is an adjustable capacitor that can include an array of capacitors configured to provide different capacitances based on an input control signal. The charging time can be adjusted by adjusting a capacitance of the adjustable capacitor. In some implementations, the charging time can be adjusted by changing the reference voltage.

Particular embodiments of the technology described in this document can be implemented so as to realize one or more of the following advantages. One or more described technologies can provide baud rate learning with high accuracy. One or more described technologies can reduce the cost of manufacturing a slave device, single-wire bus system, or both. One or more described technologies can provide the ability to effectively communicate data asynchronously over a single-wire bus with a host device that has a variable clock frequency.

While this document contains many specific implementation details, these should not be construed as limitations on the scope of any inventions or of what may be claimed, but rather as descriptions of features specific to particular embodiments of particular inventions. Certain features that are described in this document in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A device comprising:
   a detector to detect transitions on a single-wire bus that are produced by a host;
   a timing estimator to determine an estimated baud rate of the host based on the transitions, wherein the timing estimator is configured to charge a capacitor based on a charging rate in response to a detection of a first transition of the transitions, sample a capacitor voltage associated with the capacitor in response to a detection of a second transition of the transitions, and adjust the charging rate based on a comparison between the capacitor voltage and a reference voltage; and
   circuitry to communicate with the host based on the estimated baud rate.

2. The device of claim 1, wherein the timing estimator is configured to adjust the charging rate by increasing the charging rate if the capacitor voltage is less than the reference voltage, and wherein the timing estimator is configured to adjust the charging rate by decreasing the charging rate if the capacitor voltage is not less than the reference voltage.

3. The device of claim 1, comprising:
   a transistor coupled with the capacitor,
   wherein the timing estimator is configured to reset the capacitor by switching on the transistor to discharge the capacitor.

4. The device of claim 1, wherein the timing estimator is configured to determine the estimated baud rate by controlling the charging rate of the capacitor based on a control register comprising a plurality of bits arranged from a most significant bit to a least significant bit.

5. The device of claim 4, wherein the timing estimator is configured to iteratively adjust the charging rate via determining bit-by-bit each of the bits of the control register through successive ones of the transitions by starting with the most significant bit and ending with the least significant bit.

6. The device of claim 1, wherein the transitions comprise falling edge transitions.

7. The device of claim 1, comprising:
   a non-volatile memory structure; and
   a processor configured to perform an operation responsive to a command received over the single-wire bus, wherein the operation comprises retrieving data from the non-volatile memory structure in response to the command, and wherein the processor is configured to cause the data to be transmitted to the host based on the estimated baud rate.

8. A method comprising:
- detecting transitions on a single-wire bus that are produced by a host device;
- determining an estimated baud rate of the host device based on the transitions, wherein determining the estimated baud rate comprises charging a capacitor based on a charging rate in response to a detection of a first transition of the transitions, sampling a capacitor voltage associated with the capacitor in response to a detection of a second transition of the transitions, and adjusting the charging rate based on a comparison between the capacitor voltage and a reference voltage; and
- communicating with the host device based on the estimated baud rate.

9. The method of claim 8, wherein adjusting the charging rate comprises:
- increasing the charging rate if the capacitor voltage is less than the reference voltage; and
- decreasing the charging rate if the capacitor voltage is not less than the reference voltage.

10. The method of claim 8, wherein determining the estimated baud rate comprises switching on a transistor to discharge the capacitor in response to the detection of the first transition of the transitions.

11. The method of claim 8, wherein determining the estimated baud rate comprises controlling the charging rate of the capacitor based on a control register comprising a plurality of bits arranged from a most significant bit to a least significant bit.

12. The method of claim 11, wherein determining the estimated baud rate comprises determining bit-by-bit each of the bits of the control register through successive ones of the transitions by starting with the most significant bit and ending with the least significant bit.

13. The method of claim 8, wherein the transitions comprise falling edge transitions.

14. A system comprising:
- a host device; and
- a slave device coupled with the host device via a single-wire bus, wherein the slave device is configured to perform operations comprising:
  - detecting transitions on the single-wire bus that are produced by the host device,
  - determining an estimated baud rate of the host device based on the transitions, wherein determining the estimated baud rate comprises charging a capacitor based on a charging rate in response to a detection of a first transition of the transitions, sampling a capacitor voltage associated with the capacitor in response to a detection of a second transition of the transitions, and adjusting the charging rate based on a comparison between the capacitor voltage and a reference voltage, and
  - communicating with the host device based on the estimated baud rate.

15. The system of claim 14, wherein adjusting the charging rate based on the comparison comprises:
- increasing the charging rate if the capacitor voltage is less than the reference voltage; and
- decreasing the charging rate if the capacitor voltage is not less than the reference voltage.

16. The system of claim 14, wherein determining the estimated baud rate comprises switching on a transistor to discharge the capacitor in response to the detection of the first transition of the transitions.

17. The system of claim 14, wherein determining the estimated baud rate comprises controlling the charging rate of the capacitor based on a control register comprising a plurality of bits arranged from a most significant bit to a least significant bit.

18. The system of claim 17, wherein determining the estimated baud rate comprises determining bit-by-bit each of the bits of the control register through successive ones of the transitions by starting with the most significant bit and ending with the least significant bit.

19. The system of claim 14, wherein the transitions comprise falling edge transitions.

20. The system of claim 14, wherein the slave device comprises:
- a non-volatile memory structure; and
- a processor configured to perform an operation responsive to a command received over the single-wire bus, wherein the operation comprises retrieving data from the non-volatile memory structure in response to the command, and wherein the processor is configured to cause the data to be transmitted to the host device based on the estimated baud rate.

* * * * *